(12) United States Patent
Blitzer et al.

(10) Patent No.: US 8,949,168 B1
(45) Date of Patent: Feb. 3, 2015

(54) MANAGING A MEMORY OF AN EVENT-BASED ANALYSIS ENGINE

(75) Inventors: Aharon Blitzer, Shoham (IL); Aviram Katz, Kiryat Onno (IL); Amit Lieberman, Raanana (IL); Amihai Hadar, Herzelia (IL); Senya Touretski, Ramat Gan (IL); Radai Rosenblatt, Petach Tikva (IL)

(73) Assignee: EMC International Company, Hamilton (BM)

( * ) Notice: Subject to any disclaimer, the term of this patent is extended or adjusted under 35 U.S.C. 154(b) by 231 days.

(21) Appl. No.: 13/534,481

(22) Filed: Jun. 27, 2012

(51) Int. Cl.
*G06F 17/00* (2006.01)

(52) U.S. Cl.
USPC ............................................................ 706/47

(58) Field of Classification Search
USPC .................................................... 706/12, 45
See application file for complete search history.

(56) References Cited

U.S. PATENT DOCUMENTS

| | | | |
|---|---|---|---|
| 7,076,685 B2 | 7/2006 | Pillai et al. | |
| 7,409,379 B1 * | 8/2008 | Katzer .................................. | 1/1 |
| 7,482,931 B2 * | 1/2009 | Lin ............................ | 340/572.1 |
| 7,613,726 B1 | 11/2009 | Spivak et al. | |
| 7,668,953 B1 | 2/2010 | Sinclair et al. | |
| 7,761,594 B1 | 7/2010 | Mowat | |
| 7,836,427 B1 | 11/2010 | Li et al. | |
| 8,224,761 B1 | 7/2012 | Rockwood | |
| 2004/0093581 A1 | 5/2004 | Nielsen et al. | |
| 2004/0117407 A1 | 6/2004 | Kumar et al. | |
| 2004/0250258 A1 | 12/2004 | Raghuvir et al. | |
| 2005/0125688 A1 | 6/2005 | Ogawa et al. | |
| 2005/0246304 A1 | 11/2005 | Knight et al. | |
| 2006/0179028 A1 | 8/2006 | Bram et al. | |
| 2006/0179042 A1 | 8/2006 | Bram et al. | |
| 2006/0179058 A1 | 8/2006 | Bram et al. | |
| 2007/0094199 A1 | 4/2007 | Deshpande et al. | |
| 2007/0260470 A1 | 11/2007 | Bornhoevd et al. | |
| 2009/0019000 A1 | 1/2009 | Arends et al. | |
| 2009/0113387 A1 | 4/2009 | Ziegler | |
| 2009/0287628 A1 | 11/2009 | Indeck et al. | |
| 2010/0128676 A1 * | 5/2010 | Wu et al. ......................... | 370/328 |
| 2010/0175055 A1 | 7/2010 | Wang et al. | |
| 2010/0198636 A1 | 8/2010 | Choudhary et al. | |
| 2011/0138291 A1 | 6/2011 | Twiddy et al. | |
| 2011/0141913 A1 | 6/2011 | Clemens et al. | |
| 2011/0167433 A1 | 7/2011 | Applebaum et al. | |
| 2011/0191692 A1 | 8/2011 | Walsh et al. | |
| 2011/0238452 A1 * | 9/2011 | Ziade et al. ........................ | 705/4 |
| 2012/0317504 A1 | 12/2012 | Patel et al. | |

OTHER PUBLICATIONS

Blitzer et al.; "Providing Historical Data to an Event-Based Analysis Engine;" U.S. Appl. No. 13/429,524, filed Mar. 26, 2012; 17 pages.

(Continued)

*Primary Examiner* — David Vincent

(74) *Attorney, Agent, or Firm* — Daly, Crowley, Mofford & Durkee, LLP

(57) ABSTRACT

In one aspect, a method includes determining if a rule in a memory of an event-based analysis engine has been used by the event-based analysis engine within a predetermined period of time and moving the rule to a storage device if the rule in the memory of the event-based analysis engine has not been used by the event-based analysis engine within the predetermined period of time.

20 Claims, 5 Drawing Sheets

(56) References Cited

OTHER PUBLICATIONS

Blitzer et al.; "Simplifying Rules Generation for an Even-Based Analysis Engine by Allowing a User to Combine Related Objects in a Rule;" U.S. Appl. No. 13/533,159, filed Jun. 26, 2012; 29 pages.
Blitzer et al.; "Simplifying Rules Generation for an Event-Based Analysis Engine;" U.S. Appl. No. 13/534,488, filed Jun. 27, 2012; 30 pages.
Blitzer et al.; "Using Data Aggregation to Manage a Memory for an Event-Based Analysis Engine;" U.S. Appl. No. 13/727,855, 24 Pages.

Office Action dated Jun. 6, 2014 corresponding to U.S. Appl. No. 13/429,524, 13 Pages.
Response to Office Action dated Jun. 6, 2014 corresponding to U.S. Appl. No. 13/429,524, Response filed Oct. 6, 2014, 13 Pages.
Office Action dated Feb. 13, 2014 corresponding to U.S. Appl. No. 13/533,159, 14 Pages.
Response to Office Action dated Feb. 13, 2014 corresponding to U.S. Appl. No. 13/533,159, Response filed Aug. 13, 2014, 12 Pages.
Office Action dated Jan. 31, 2014 corresponding to U.S. Appl. No. 13/534,488, 23 Pages.
Response to Office Action dated Jan. 31, 2014 corresponding to U.S. Appl. No. 13/534,488, Response filed Jul. 30, 2014, 13 Pages.

* cited by examiner

MANAGING A MEMORY OF AN EVENT-BASED ANALYSIS ENGINE

BACKGROUND

An event-based analysis engine reacts to one or more events. For example, if an event occurs, the event-based analysis engine performs an action based on a rule. In one particular example, the event may be based on historical information.

SUMMARY

In one aspect, a method includes determining if a rule in a memory of an event-based analysis engine has been used by the event-based analysis engine within a predetermined period of time and moving the rule to a storage device if the rule in the memory of the event-based analysis engine has not been used by the event-based analysis engine within the predetermined period of time.

In another aspect, an article includes a non-transitory machine-readable medium that stores executable instructions to manage a memory of an event-based analysis engine. The instructions cause a machine to determine if a rule in a memory of an event-based analysis engine has been used by the event-based analysis engine within a predetermined period of time and to move the rule to a storage device if the rule in the memory of the event-based analysis engine has not been used by the event-based analysis engine within the predetermined period of time.

In a further aspect, an apparatus includes circuitry configured to manage memory of an event-based analysis engine. The circuitry further configured to determine if a rule in a memory of an event-based analysis engine has been used by the event-based analysis engine within a predetermined period of time and move the rule to a storage device if the rule in the memory of the event-based analysis engine has not been used by the event-based analysis engine within the predetermined period of time.

DETAILED DESCRIPTION

Information Technology (IT) environments include a large number of network, computer, storage and backup equipment, which generate a high number of events in a short period of time. An event-based analysis engine that analyzes these events needs to be able to handle many events and to validate many rules efficiently. To do so the event-based analysis engine is required to keep the rules, facts (objects) and the events in memory so it will be able to evaluate every event quickly. In a very large environment this method consumes a lot of memory thereby generating scalability issues.

Described herein are techniques to handle rules and associated data that are loaded into a memory of an event-based analysis engine. In one example, a rule that is not needed or not used for a specified time will be moved from the memory of an event-based analysis engine stored in a storage disk. If an event requiring a removed rule occurs, the remove rule is reloaded into the memory of the event-based analysis engine.

Figure 1:
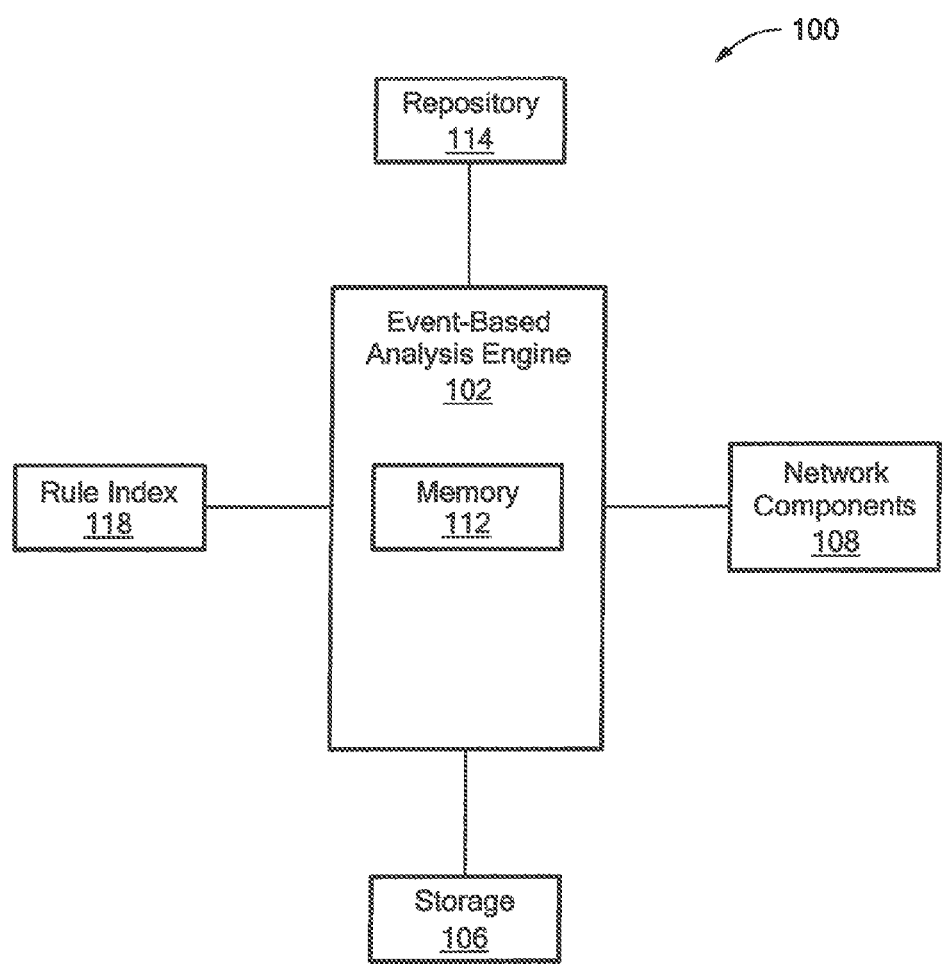
FIG. 1 is a block diagram of an example of a system that includes an event-based analysis engine.

Referring to FIG. 1, a system 100 includes an event-based analysis engine 102, a storage device 106, network components 108, a rules repository and a rules index 118 used to track the rules. The event-based analysis engine 102 receives the events generated by the network components and process rules for the events received (e.g., determines an appropriate rule to apply to each event and determines if the rule has been met). In one example, the network components 108 include one or more of hosts, storage arrays, switches (e.g., a fiber channel switch), data protection appliances, applications and so forth.

The event-based analysis engine 102 includes a memory 112. As will be described further herein, the rules that have been used within a predetermined time period remain stored in the memory 112 while rules that have not been used in the predetermined time period are moved to the storage device 106.

The repository 114 includes the rules that will be loaded into the memory 112.

The rule index 118 includes entries that include the location of the rule, for example, whether it is stored in the memory 112 or the storage device 106. In one particular example, each entry of the rules index 118 includes a rule field, a node field, an event types field, a location field, an analysis field and a last used field.

The rule field indicates the rule. For example, the rule could be: generate an alert if the central processing unit (CPU) utilization is above 96%.

The node field indicates which node the rule applies. A node can be any device such as a host, a storage array, a switch and so forth. A node may also be an application.

The event type field indicates the type of event. For example, the event could be CPU utilization from a Host A.

The location field indicates the location where the rule is being stored. For example, the rule may be stored at the memory 112 or at the storage device 106.

The analysis session field includes information that the event-based analysis engine 102 keeps for a specific rule. The last used field indicates the last time the rule was used.

Figure 2:
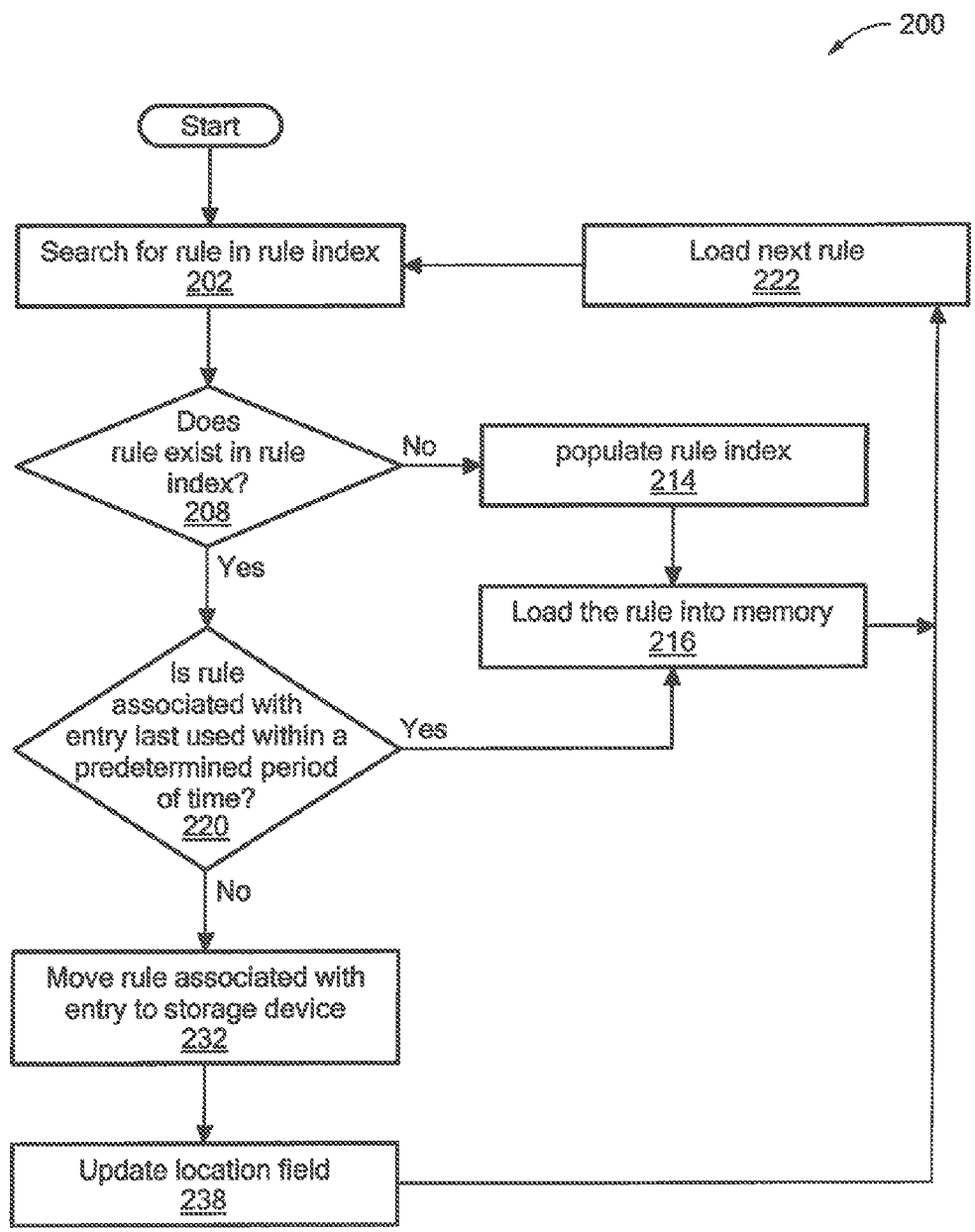
FIGS. 2 to 4 are flowcharts of examples of processes to manage a memory of the event-based analysis engine.

Referring to FIG. 2, an example of a process to load rules in the memory 112 that have been used within a predetermined time period is a process 200. Initially, process 200 searches for a rule in the rule index 118 (202) and determines if the rule exists in the rule index (208). If the rule does not exist, process 200 populates the rule index 118 (214), loads the rule into memory 112 (216) and goes to the next rule (222).

If the rule exists in the rule index, process 200 determines if the rule associated with the entry was last used within a predetermined period of time (220). For example, the process 200 reads the last used field in the entry and determines if the rule associated with the entry has been used within the predetermined period of time. If the rule has been used within the predetermined period of time, process 200 loads the rule into memory (214).

If the rule has not been used within a predetermined period of time, process 200 moves the rule associated with the entry to the storage device 106 (232) and the location field of an entry of the rule index 118 associated with the rule is updated (238), for example, to indicate a location at storage device 106. In one example, the rule and data associated with the rule are transferred to the storage device 106 if the rule has not been used within a predetermined period of time. The data associated with the rule includes prior event data. In another example, the data associated with the rule can be the last status of the node or any other information that is needed for the rule and uses memory. In one example the data is kept in the analysis session field. Process 200 goes to the next rule (222).

Figure 3:
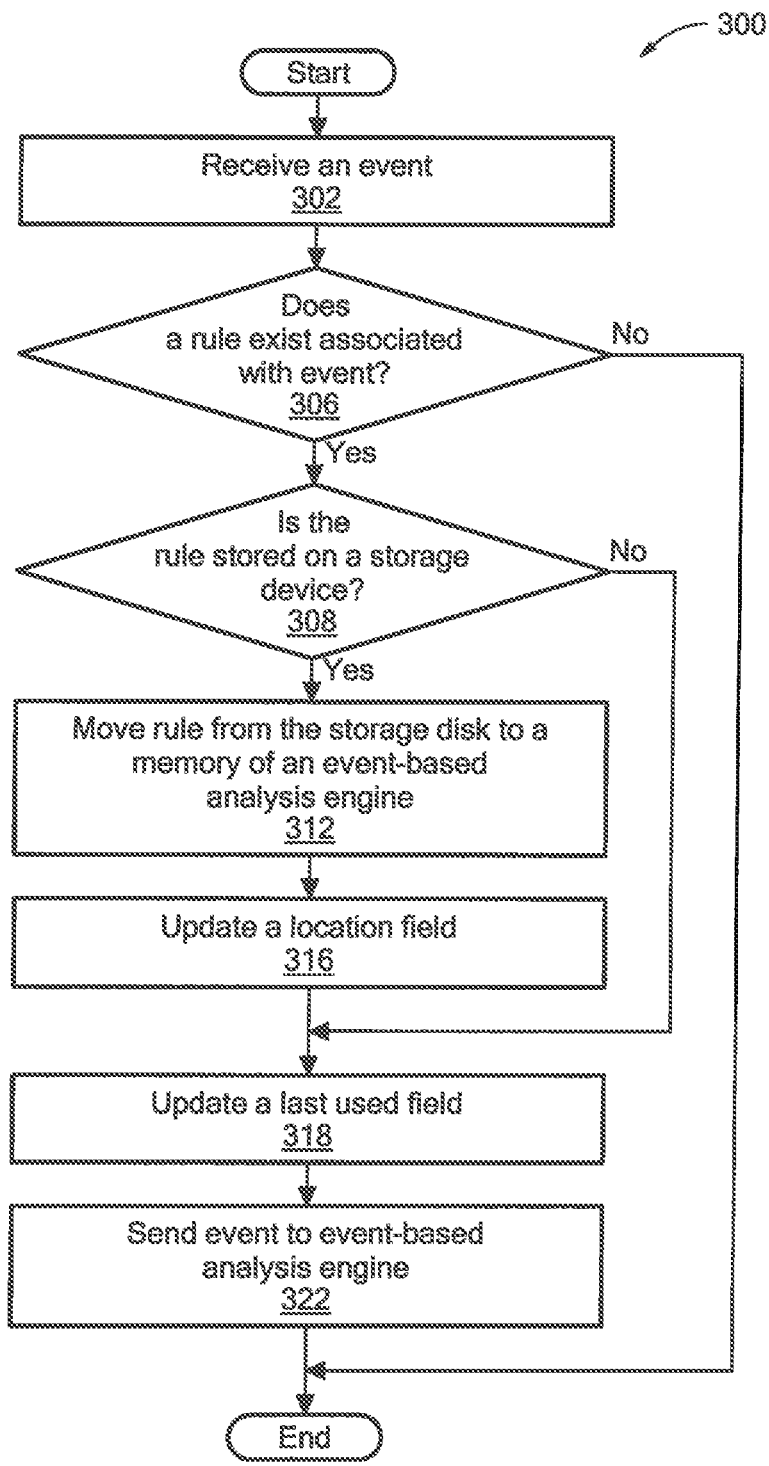

Referring to FIG. 3, an example of a process to prepare the analysis engine to process an event is a process 300. Process 300 receives an event (302). For example, components from the network of components 108 send event messages to the event-based analysis engine 102.

Process 300 determines if a rule exists that is associated with the event received (306). For example, the process 300 searches the rule index 118. If the rule exists, process 300 determines if the rule is stored the storage device 106 (308). For example, for the entry in the rules index 118, the process 300 reads the location field to determine if the rule is stored in the memory 112 or the storage device 106. If the rule is stored on the storage device 106, the process 300 moves the rule from the storage device 106 to the memory 112 (312) and the location field of an entry associated with the rule is updated (318), for example, from indicating a location at storage device 106 to indicating a location at memory 112. In one example, the rule and data associated with rule are transferred from the storage device 106 to the memory 112.

Process 300 updated the last used field of the entry (318). Process 300 sends an event to the event-based analysis engine 103 (322), for example, after verifying that the rule is in the memory. After process 300 has been executed, the event-based analysis engine can process the rule associated with the event received.

Figure 4:
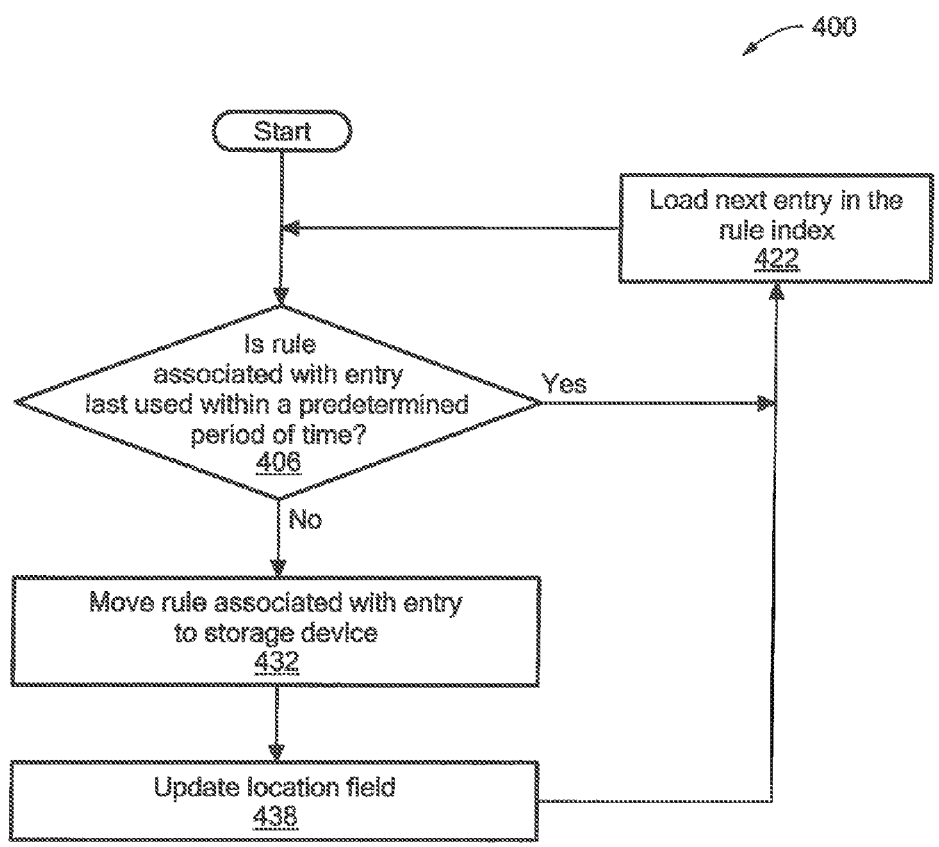

Referring to FIG. 4, an example of a process to remove a rule from memory 112 is a process 400. In this example process a rule has been loaded but the event using the rule has not occurred within a predetermined period of time.

Process 400 determines if the rule associated with the entry was last used within a predetermined period of time (406). For example, the process 400 reads the last used field in the entry and determines if the rule associated with the entry has been used within the predetermined period of time. If the rule has been used within the predetermined period of time, process 200 loads a next entry from the rule index (422).

If the rule has not been used within a predetermined period of time, process 400 moves the rule associated with the entry from the memory 112 to the storage device 106 (432) and the location field of an entry of the rule index 118 associated with the rule is updated (438), for example, from indicating a location at memory 112 to indicating a location at storage device 106. In one example, the rule and data associated with the rule are transferred to the storage device 106 if the rule has not been used within a predetermined period of time. The data associated with the rule includes prior event data. In another example, the data associated with the rule can be the last status of the node or any other information that is needed for the rule and uses memory. In one example the data is kept in the analysis rule session.

Figure 5:
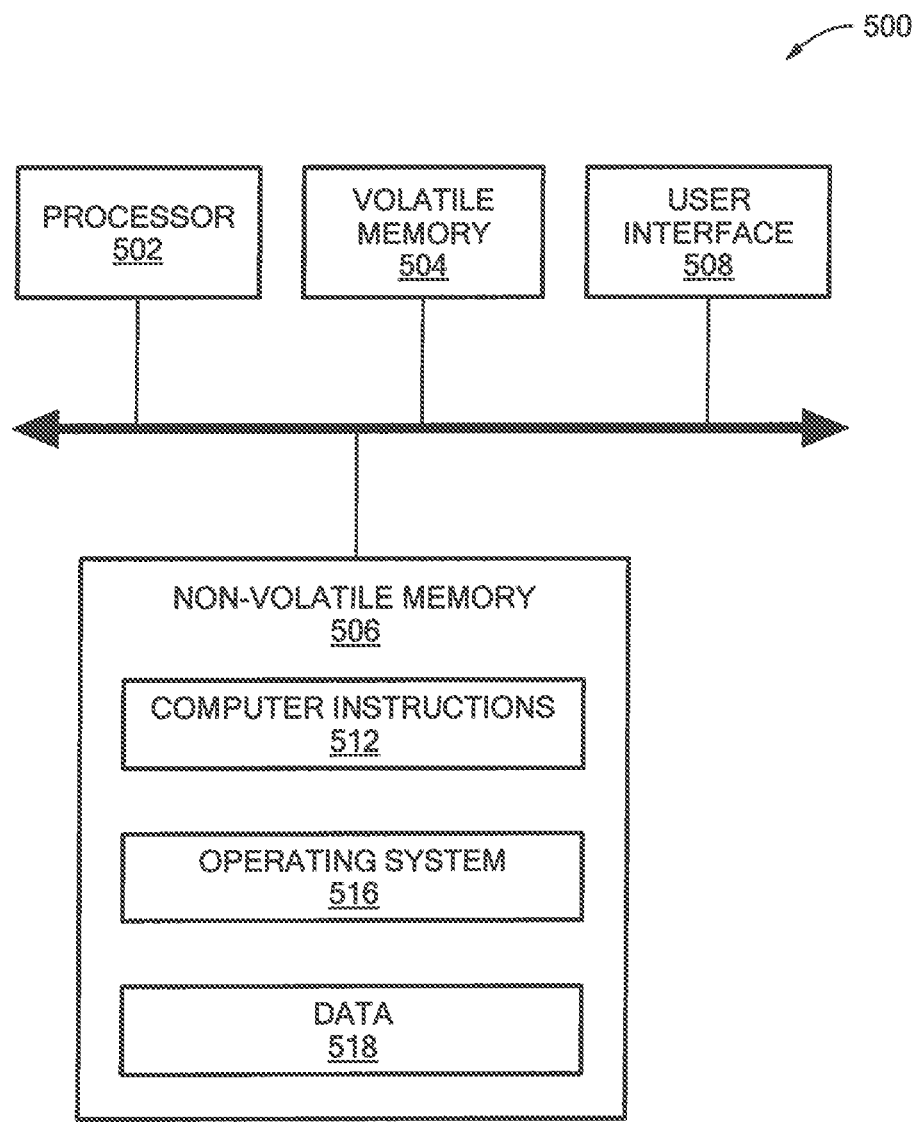
FIG. 5 is a block diagram of a computer on which any of the processes of FIGS. 2 to 4 may be implemented.

Referring to FIG. 5, an example of a computer to perform any of the processes described herein is a computer 500. The computer 500 includes a processor 502, a volatile memory 504, a non-volatile memory 506 (e.g., hard disk) and a user interface (UI) 508 (e.g., a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., the processes 200, 300 and 400).

The processes described herein (e.g., the processes 200, 300 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The system and processes described herein are not limited to the specific examples described. For example, the processes 200, 300 and 400 are not limited to the specific processing order of FIGS. 2 to 4, respectively. Rather, any of the processing blocks of FIGS. 2 to 4 may be re-ordered, combined or removed, performed in parallel or in serial, as necessary, to achieve the results set forth above.

The processing blocks (for example, in the process 200 of FIG. 2, in the process 300 of FIG. 3 and/or in the process 400 of FIG. 4) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
   determining if a rule in a memory of an event-based analysis engine has been used by the event-based analysis engine within a predetermined period of time comprising analyzing a last used field of an entry of a rule index; and
   moving the rule to a storage device if the rule in the memory of the event-based analysis engine has not been used by the event-based analysis engine within the predetermined period of time.

2. The method of claim 1 wherein moving the rule to a storage device if the rule in the memory of the event-based analysis engine has not been used by the event-based analysis engine within the predetermined period of time comprises:
   storing the rule at the storage device; and
   removing the rule from the memory.

3. A method, comprising:
   determining if a rule in a memory of an event-based analysis engine has been used by the event-based analysis engine within a predetermined period of time; and
   moving the rule to a storage device if the rule in the memory of the event-based analysis engine has not been used by the event-based analysis engine within the predetermined period of time; and
   updating a location field in an entry of a rule index if the rule is moved from the memory to the storage device.

4. The method of claim 1 wherein moving the rule to a storage device if the rule in the memory of the event-based analysis engine has not been used by the event-based analysis engine within the predetermined period of time comprises moving the rule and data associated with the rule.

5. The method of claim 1, further comprising:
   receiving, at the event-based analysis engine, an event;
   determining if a rule exists that is associated with the event received;
   determining if the rule is stored at one of the memory of the event-based analysis engine or the storage device if the rule exists; and
   moving the rule from the storage device to the memory of the event-based analysis engine if the rule is stored at the storage device.

6. The method of claim 5, further comprising updating a last used field in the entry of the rule index.

7. The method of claim 5 wherein determining if the rule is stored at one of the memory of the event-based analysis engine or the storage device if the rule exists comprises reading a location field in the entry of the rule index.

8. The method of claim 5, further comprising updating a location field in the entry of the rule index if the rule is moved from the storage device to the memory.

9. The method of claim 5 wherein moving the rule from the storage device to the memory of the event-based analysis engine if the rule is stored at the storage device comprises moving the rule and data associated with the rule.

10. An article comprising:
    a non-transitory machine-readable medium that stores executable instructions to manage a memory of an event-based analysis engine, the instructions causing a machine to:
       determine if a rule in a memory of an event-based analysis engine has been used by the event-based analysis engine within a predetermined period of time comprising instructions causing the machine to analyze a last used field of an entry of a rule index; and
       move the rule to a storage device if the rule in the memory of the event-based analysis engine has not been used by the event-based analysis engine within the predetermined period of time.

11. The article of claim 10 wherein the instructions causing the machine to move the rule to a storage device if the rule in the memory of the event-based analysis engine has not been used by the event-based analysis engine within the predetermined period of time comprises instructions causing the machine to:
    store the rule at the storage device; and
    remove the rule from the memory.

12. The article of claim 10 wherein the instructions causing the machine to move the rule to a storage device if the rule in the memory of the event-based analysis engine has not been used by the event-based analysis engine within the predetermined period of time comprises instructions causing the machine to move the rule and data associated with the rule.

13. The article of claim 10, further comprising instructions causing the machine to:
    receive, at the event-based analysis engine, an event;
    determine if a rule exists that is associated with the event received;
    determine if the rule is stored at one of the memory of the event-based analysis engine or the storage device if the rule exists; and
    move the rule from the storage device to the memory of the event-based analysis engine if the rule is stored at the storage device.

14. An apparatus, comprising:
    circuitry configured to manage memory of an event-based analysis engine and configured to:
       determine if a rule in a memory of an event-based analysis engine has been used by the event-based analysis engine within a predetermined period of time comprising circuitry configured to analyze a last used field of an entry of a rule index; and
       move the rule to a storage device if the rule in the memory of the event-based analysis engine has not been used by the event-based analysis engine within the predetermined period of time,
       wherein the circuitry comprises at least one of a processor, a memory, programmable logic and logic gates.

15. The apparatus of claim 14 wherein the circuitry to move the rule to a storage device if the rule in the memory of the event-based analysis engine has not been used by the event-based analysis engine within the predetermined period of time comprises circuitry configured to:
    store the rule at the storage device; and
    remove the rule from the memory.

16. The apparatus of claim 14 wherein the circuitry to move the rule to a storage device if the rule in the memory of the event-based analysis engine has not been used by the event-based analysis engine within the predetermined period of time comprises circuitry configured to move the rule and data associated with the rule.

17. The apparatus of claim 14, wherein the circuitry is further configured to:
    receive, at the event-based analysis engine, an event;
    determine if a rule exists that is associated with the event received;
    determine if the rule is stored at one of the memory of the event-based analysis engine or the storage device if the rule exists; and
    move the rule from the storage device to the memory of the event-based analysis engine if the rule is stored at the storage device.

18. The apparatus of claim 14, further comprising circuitry configured to update a location field in the entry of the rule index if the rule is moved from the memory to the storage device.

19. The article of claim 10, further comprising instructions causing the machine to update a location field in the entry of the rule index if the rule is moved from the memory to the storage device.

20. The article of claim 10, further comprising instructions causing the machine to:
   receive, at the event-based analysis engine, an event;
   determine if a rule exists that is associated with the event received;
   determine if the rule is stored at one of the memory of the event-based analysis engine or the storage device if the rule exists comprising instructions causing the machine to read a location field in the entry of the rule index;
   move the rule from the storage device to the memory of the event-based analysis engine if the rule is stored at the storage device;
   updating the last used field in the entry of the rule index; and
   updating the location field in the entry of the rule index if the rule is moved from the storage device to the memory.

* * * * *